United States Patent [19]

Eagan

[11] Patent Number: 5,398,634
[45] Date of Patent: Mar. 21, 1995

[54] MOORING OF WATERCRAFT

[76] Inventor: Joe D. Eagan, Rte. 1, Box 385, Greenfield, Mo. 65661

[21] Appl. No.: 298,797

[22] Filed: Aug. 31, 1994

[51] Int. Cl.⁶ .............................................. B63B 21/00
[52] U.S. Cl. ................................ 114/230; 114/221 R
[58] Field of Search ........... 114/294, 230, 250, 221 R, 114/219; 280/494, 493; 294/19.1, 82.19

[56] References Cited

U.S. PATENT DOCUMENTS

| | | | |
|---|---|---|---|
| 3,863,591 | 2/1975 | Wild | 114/230 |
| 4,708,083 | 11/1987 | Billings | 114/230 |
| 4,751,892 | 6/1988 | Sechal et al. | 114/230 |
| 4,781,138 | 11/1988 | Hay | 114/230 |
| 4,977,846 | 12/1980 | Landa et al. | 114/230 |
| 5,046,442 | 9/1991 | Hay | 114/230 |

Primary Examiner—Edwin L. Swinehart
Attorney, Agent, or Firm—William R. Sharp

[57] ABSTRACT

A watercraft mooring device is disclosed herein which comprises a tubular member having a rope extending through an interior bore so as to form a loop at each end of the tubular member, and which further extends exterior to the tubular member from a hole in the sidewall of the tubular member to one end of the rope. The other end of the rope is secured in the interior bore. In mooring a watercraft to another object, such as a dock, one loop is connected to a watercraft mooring member (i.e. cleat) and the other loop is connected to a dock mooring member. That portion of the rope extending from the sidewall hole is then cinched around the tubular member. A method of assembling the mooring device is also disclosed.

20 Claims, 2 Drawing Sheets

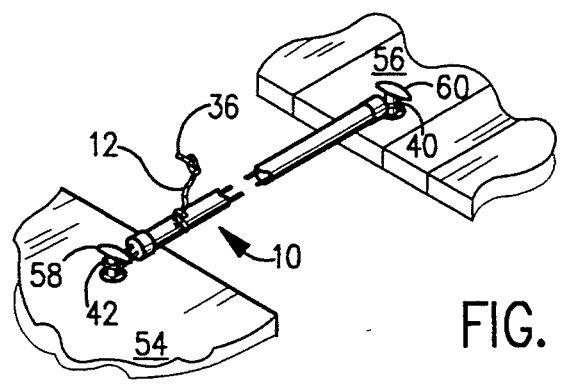
FIG. 4
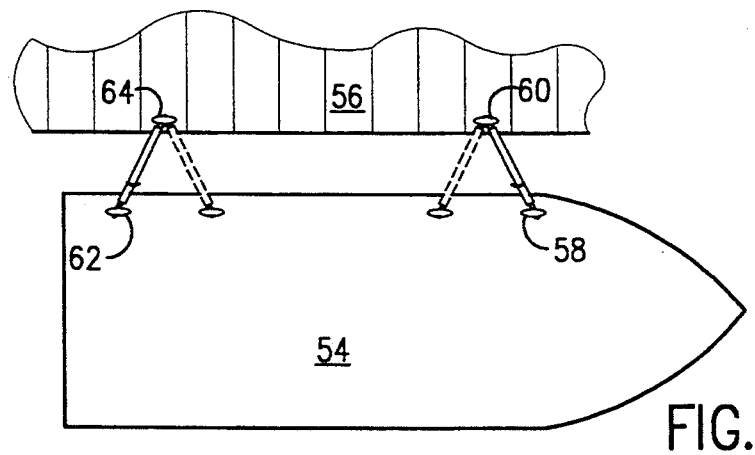
FIG. 5
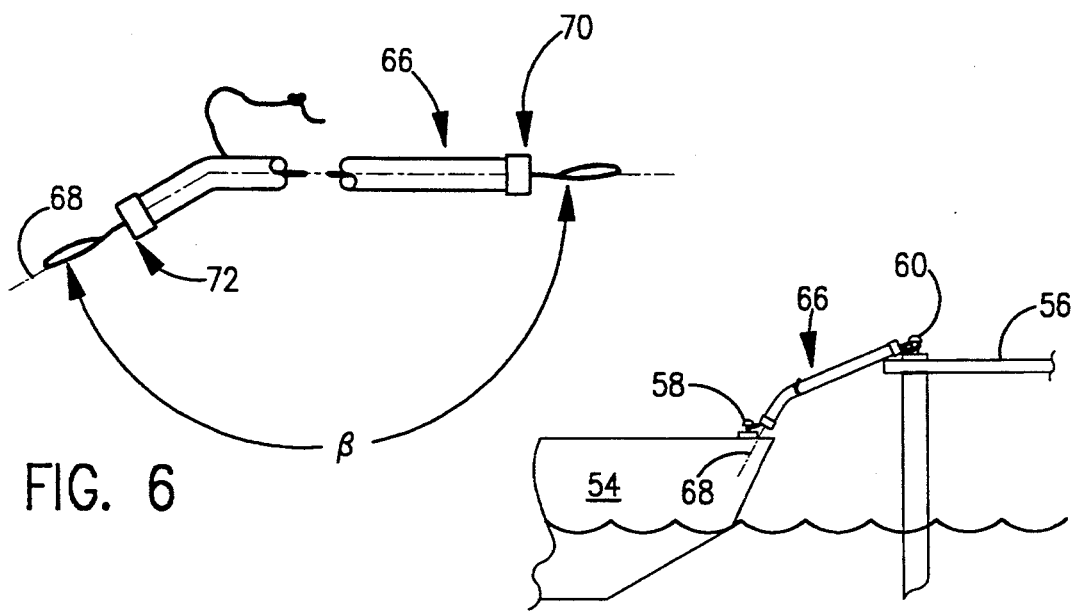
FIG. 6
FIG. 7

MOORING OF WATERCRAFT

BACKGROUND OF THE INVENTION

This invention relates to a watercraft mooring device and methods for its assembly and use.

Various watercraft mooring devices have been developed for mooring of a watercraft, such as a boat, to a dock. Two such devices are described in U.S. Pat. No. 4,708,083 of Billings and U.S. Pat. No. 4,977,846 of Landa et al.

The Billings device comprises a spacer tube having end fittings mounted on each respective end of the spacer tube, a cleat mounted to the exterior surface of the spacer tube, and a cord which is received through apertures in the end fittings to form a loop at each end of the spacer tube. The mooring device is connected between a boat and dock by tightly wrapping one loop around the cleat on the boat to thereby seat one end fitting against the boat cleat, and wrapping the other loop around a cleat on the dock to similarly seat the other end fitting against the dock cleat. The cord is then fastened to the cleat on the spacer tube. The Billings device effectively moors a boat to a dock while spacing the boat from the dock, but leaves the cord totally exposed outside of the spacer tube. When storing the device in, for example, a deck locker on the boat when not in use, the exposed cord can become entangled with other items (such as fishing tackle) in the locker. The exposed cord also speeds the deterioration of the cord due to exposure to the elements. Furthermore, the Billings device will not allow mooring of a boat to a dock at substantially different vertical levels and will not effectively accomodate the rise and fall of the water, due to the very tight connection between the end fittings and the respective cleats of the boat and dock.

The Landa device comprises a mooring arm, similar to the spacer tube of the Billings device, having one end which pivotally connects to a bracket mounted to a dock, and another end which connects to a boat cleat by means of a looped rope extending from such end. The Landa device overcomes some of the disadvantages of the Billings device by enclosing the rope within the mooring arm and by pivotally connecting one end of the mooring arm to the dock to allow for variations in the vertical level of the boat. However, the Landa device lacks versatility insofar as (1) a bracket structurally compatible with the mooring arm must be premounted to a dock for the device to be functional, and (2) a pair of brackets mounted to a dock in accordance with typical practice may have a distance between the brackets which does not match the distance between the corresponding pair of cleats on many boats. In regard to (2), it should be noted that the distance between pairs of cleats on a boat are not standardized and therefore vary widely.

SUMMARY OF THE INVENTION

It is, therefore, an object of the invention to provide a watercraft mooring device which combines the various advantages of the above-mentioned prior art devices in a single device; that is, such watercraft mooring device should substantially enclose a rope within a tubular member (which also serves to space the watercraft from another object, such as a dock or another watercraft), allow its use in conjunction with conventional mooring members (i.e. cleats) already present on most docks and which are separated by a distance not necessarily matching the distance of separation between corresponding watercraft mooring members, allow for the rise and fall of the water level, and also preferably allow its use when there is a substantial disparity between the verical levels of a watercraft and the object to which it is moored.

The above object is accomplished by a watercraft mooring device comprising: a tubular member having a sidewall with a sidewall hole therethrough, an interior bore, a capped first tube end with a first end hole and a second end hole therethrough, a capped second tube end with a first end hole and a second end hole therethrough; a rope having a first rope end and a second rope end, the rope extending from the first rope end exterior to the tubular member and through the sidewall hole into the interior bore, through the interior bore to the first tube end and through the first end hole of the first tube end, back to the first tube end and through the second end hole of the first tube end so as to form a first loop exterior to the tubular member and adjacent to the first tube end, through the interior bore to the second tube end and through the first end hole of the second tube end, back to the second tube end and through the second end hole of the second tube end to the second rope end within the interior bore so as to form a second loop exterior to the tubular member and adjacent to the second tube end, the second rope end in the interior bore being secured within such interior bore so as to prevent being pulled through the second end hole of the second tube end.

According to another aspect of the invention, there is provided a method of mooring a watercraft to another object, wherein the object has a mooring member and the watercraft also has a mooring member, the method comprising: (a) providing a mooring device as described above; (b) connecting the first loop of the mooring device to the watercraft mooring member; (c) connecting the second loop of the mooring device to the object mooring member; and (d) after steps (b) and (c), cinching that portion of the rope which extends from the first rope end to the sidewall hole around the tubular member.

According to yet another aspect of the invention, there is provided a method for assembling a watercraft mooring device comprising: (a) providing (i) a tubular member having a sidewall with a sidewall hole therethrough, an interior bore, an open first tube end, and an open second tube end, (ii) a first cap having a first cap hole and second cap hole therethrough, (iii) a second cap having a first cap hole and a second cap hole therethrough, and (iv) a rope having a first rope end and a second rope end; (b) passing the second rope end through the sidewall hole, interior bore, and the cap holes of the first and second caps according to the following sequence—through the sidewall hole and into the interior bore, through the interior bore toward and through the first tube end, through the first cap hole of the first cap, through the second cap hole of the first cap so as to form a first loop, back into the interior bore, through the interior bore toward and through the second tube end, through the first cap hole of the second cap, through the second cap hole of the second cap so as to form a second loop, and back into the interior bore; (c) after passing the second rope end through the first cap hole of the first cap in (b), fixedly securing the first cap over and to the first tube end; (d) after the second rope end is passed through the second cap hole of the second cap but before it is passed back into the interior bore in (b), providing a means near or at the second rope end to prevent pulling the second rope end back through the second cap hole of the second cap; (e) after (d), fixedly securing the second cap over and to the second tube end such that the second loop is exterior to the tubular member and adjacent to the second tube end; wherein after the completion of steps (a)–(e), the first rope end remains exterior to the tubular member and the first and second loops are exterior to the tubular member and closely adjacent to the first and second tube ends, respectively.

The mooring device of the invention clearly encloses its rope within the tubular member to accomplish the advantages discussed above. The tubular member also assists in spacing a watercraft from another object to which it is moored to avoid possibly damaging contact. The loops allow connection with conventional mooring members such as cleats for optimum convenience and versatility, and such loops provide secure but nonrigid connection to mooring members so as to allow the rise and fall of the water level without damage to the mooring device or mooring members. According to a preferred embodiment of the invention, the tubular member of the mooring device has a bend therealong (as described in more detail hereafter) to allow use of the mooring device when there is a substantial disparity between the vertical levels of the watercraft and the object to which it is moored.

BRIEF DESCRIPTION OF THE DRAWINGS

FIG. 4 is a perspective view of the mooring device of FIGS. 1 and 2, shown as being connected between the cleats of a watercraft and a dock.

FIG. 5 is a top view of a pair of mooring devices employed to moor a watercraft to a dock in accordance with the invention.

FIG. 6 illustrates an embodiment of the mooring device of the invention having a bend along the tubular member of the mooring device.

FIG. 7 illustrates use of the embodiment of FIG. 6 in mooring a watercraft to a dock, where the watercraft and dock are at substantially different vertical levels.

DETAILED DESCRIPTION OF THE INVENTION

Preferred embodiments of the invention will now be described with reference to the FIGURES. Some terms used in such description and in the appended claims are defined below.

The "longitudinal axis" of a member is herein defined as a line, not necessarily straight, extending lengthwise through the member and about which at any particular point on such axis the member is generally symmetrical.

An "acute angle" is defined herein as being an angle of less than 90°.

An "obtuse angle" is defined herein as being an angle of greater than 90° but less than 180°.

A "watercraft" is defined herein as any craft capable of traveling upon a body of water.

Figure 1:
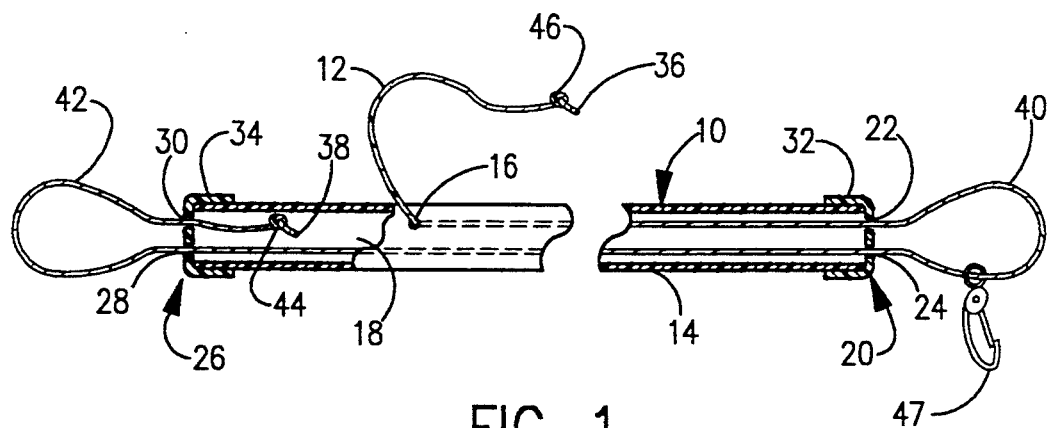
FIG. 1 is a partial cross-sectional view of a mooring device in accordance with the invention. A portion of the mooring device is broken away for ease of illustration.

Referring to FIG. 1, the illustrated watercraft mooring device comprises a tubular member 10 and a rope 12 received through the tubular member in a manner discussed in detail below. Tubular member 10 can be comprised of any suitably rigid material, but a plastic material such as polyvinyl chloride is particularly preferred due to high durability and low cost. Rope 12 can be comprised of any suitable material used in mooring of watercraft, such as nylon.

Tubular member 10 has a sidewall 14 with a sidewall hole 16 therethrough, an interior bore 18, a capped tube end 20 with cap/end holes 22 and 24 therethrough, and a capped tube end 26 with cap/end holes 28 and 30 therethrough. Tube ends 20 and 26 are capped by means of caps 32 and 34, respectively, which fit securely over such tube ends. Caps 32 and 34 are preferably composed of the same material as tubular member 10, such as polyvinyl chloride. Typical dimensions of tubular member 10, which are suitable for most applications, include an inside diameter of about 1 inch, a sidewall thickness of about ¼ inch, and a length of about 30 to about 55 inches.

Rope 12 has a rope end 36 and a rope end 38, wherein the rope extends through the illustrated mooring device in the following manner: from rope end 36 exterior to tubular member 10 and through sidewall hole 16 into interior bore 18; through interior bore 18 to tube end 20 and through cap/end hole 22; back to tube end 20 and through cap/end hole 24 so as to form a loop 40 exterior to tubular member 10 and adjacent to tube end 20; through interior bore 18 to tube end 26 and through cap/end hole 28; back to tube end 26 and through cap/end hole 30 to rope end 38 within interior bore 18 so as to form a loop 42 exterior to tubular member 10 and adjacent to tube end 26.

Rope end 38 is secured within interior bore 18 so as to prevent being pulled through cap/end hole 30, preferably and most conveniently by means of a knot 44 in the rope near or at rope end 38. Knot 44 has a diameter larger than the diameter of cap/end hole 30. Similarly, another knot 46, having a diameter larger than the diameter of sidewall hole 16, is also preferably provided in the rope near or at rope end 36 to prevent rope end 36 from being pulled through sidewall hole 16.

Optionally, either or both of loops 40 and 42 can have a selectively closable clasp connected thereto, such as the clasp 47 shown in FIG. 1 as being connected to loop 40. Such a clasp allows for connection of the corresponding loop to a mooring member, such as a closed ring, which cannot otherwise be connected to the loop.

Figure 2:
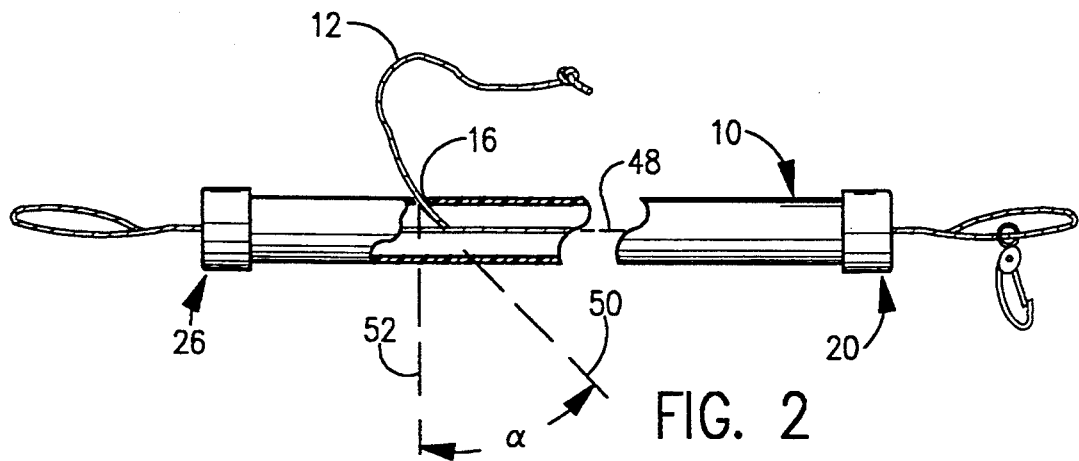
FIG. 2 is a partial cross-sectional view of the mooring device shown in FIG. 1, but rotated to a different position about its longitudinal axis to more clearly show the orientation of a sidewall hole.

Referring now to FIG. 2, the longitudinal axis of tubular member 10 is indicated at 48 and the longitudinal axis of sidewall hole 16 is indicated at 50. A plane 52 passing through sidewall hole 16 and perpendicular to longitudinal axis 48 divides interior bore 18 into a portion extending from plane 52 to tube end 26 and another portion extending from plane 52 to tube end 20, sidewall hole 16 being oriented such that longitudinal axis 50 extends into and through the latter portion of interior bore 18. As shown, longitudinal axis 50 defines an acute angle α with respect to plane 52, preferably in the range of about 30° to about 60°. Such angular orientation of sidewall hole 16 is very desirable because it serves to direct the rope in a direction toward tube end 20 in assembly of the mooring device (as will be more apparent in the discussion of FIG. 3), and because it also eases pulling of the rope into or out of sidewall hole 16 in use of the mooring device in mooring of a watercraft (as will be more apparent in the discussion of FIG. 4).

With respect to the longitudinal position of sidewall hole 16, plane 52, which passes through sidewall hole 16 and intersects longitudinal axis 48, is preferably positioned nearer to tube end 26 than to tube end 20 as measured along longitudinal axis 48. Such position is preferred for the convenience of a user, on a watercraft being moored, cinching rope 12 around tubular member 10 (as will also be more apparent in the discussion of FIG. 4).

Figure 3:
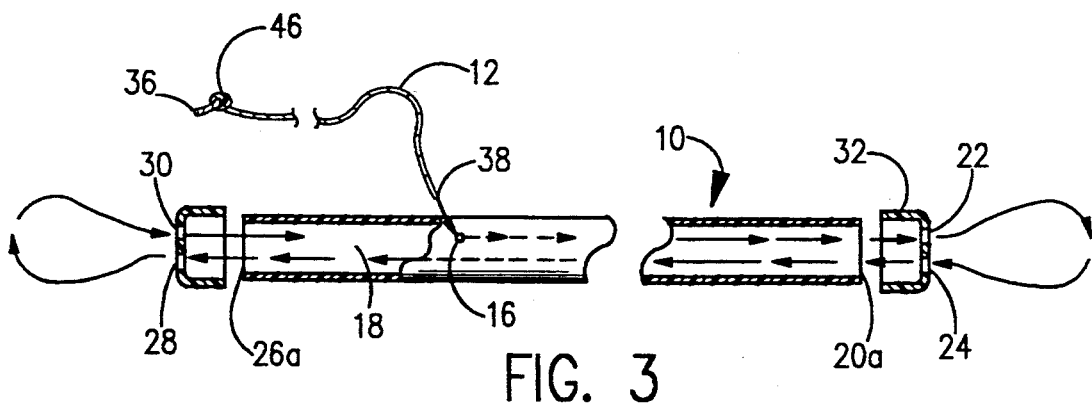
FIG. 3 is a partial cross-sectional view of the mooring device of FIGS. 1 and 2 prior to assembly and in the same rotational position as in FIG. 1. This FIGURE also shows by means of arrows the manner in which a rope is manipulated in assembly of the mooring device.

Referring now to FIG. 3, the mooring device of FIGS. 1 and 2 is assembled as follows. Tubular member 10 having open tube ends 20a and 26a, rope 12 (a substantial portion of which is broken away in FIG. 3), cap 32, and cap 34 are the starting components for assembly. Rope end 38 is passed through sidewall hole 16, interior bore 18, and the cap holes (such holes being "end" holes only after assembly) according to the following sequence and as illustrated by the arrows—through sidewall hole 16 and into interior bore 18, through interior bore 18 toward and through open tube end 20a, through cap hole 22, through cap hole 24 so as to form a loop (loop 40 in FIG. 1), back into interior bore 18, through interior bore 18 toward and through open tube end 26a, through cap hole 28, through cap hole 30 so as to form a loop (loop 42 in FIG. 1), and back into interior bore 18. Cap 32 is fixedly secured, with a suitable cement or adhesive, over and to open tube end 20a at any time after rope end 38 is passed through cap hole 22 in (b). A knot (knot 44 in FIG. 1) is tied in the rope near or at rope end 38 after rope end 38 is passed through cap hole 30 but before it is passed back into the interior bore. Cap 34 is then fixedly secured, with a suitable cement or adhesive, over and to open tube end 26a. Knot 46 can be tied near or at rope end 36 at any time during assembly.

Referring now to FIG. 4, a close-up view of a small portion of a watercraft 54 and dock 56 are shown. Watercraft 54 has cleat 58 fixedly mounted thereto, and dock 56 also has a similarly mounted cleat 60. Employing the mooring device of FIGS. 1 and 2, watercraft 54 is moored to dock 56 by placing loops 40 and 42 around cleats 60 and 58, respectively, to connect such loops to the cleats, and then grasping rope 12 near rope end 36 and pulling the rope to tighten the loops around the cleats as desired, followed by cinching that portion of rope 12 which extends from rope end 36 to sidewall hole 16 around tubular member 10. Rope 12 as cinched around tubular member 10 is shown in FIG. 3. The loops are preferably tightened around the cleats to the extent necessary to provide a stable mooring, but not so tightly as to prevent ease of up and down movement of watercraft 54 due to the rise and fall of the water.

Referring now to FIG. 5, watercraft 54 is shown as being moored to dock 56 by means of the previously described mooring device connected between watercraft cleat 58 and dock cleat 60, and further by another substantially identical mooring device connected between watercraft cleat 62 and dock cleat 64. The procedure described above for mooring the watercraft to the dock is carried out with one mooring device and its corresponding cleats, and then repeated for the other mooring device and its corresponding cleats. It can be seen that the horizontal distance between watercraft cleats 58 and 62 as shown in solid lines is greater than the horizontal distance between dock cleats 60 and 64. The opposite condition of disparity in horizontal distance is shown in broken lines.

Such a disparity in the horizontal distance between cleats poses no problem for the mooring device of the invention. It has been found that such a disparity in horizontal distance actually contributes to the stability of the mooring using a pair of mooring devices as shown, due to the consequent nonperpendicular orientation of each mooring device with respect to the longitudinal axis of the watercraft.

Referring now to FIG. 6, there is shown an embodiment of a mooring device in accordance with the invention which is particularly useful in situations where there is a substantial disparity in the vertical levels of a watercraft mooring member and a dock mooring member. The illustrated mooring device is like the embodiment shown in FIGS. 1 and 2, except for a tubular member, indicated at 66, having a bend therealong. Tubular member 66 has a longitudinal axis 68, tube end 70, and tube end 72. An obtuse angle $\beta$ is defined between longitudinal axis 68 at tube end 70 and longitudinal axis 68 at tube end 72. Angle $\beta$ is preferably in the range of about 135° to and about 165°.

Referring now to FIG. 7, there is shown watercraft 54 moored to dock 56 employing the mooring device of FIG. 6. Cleat 58 on watercraft 54 is shown as being at a vertical level substantially below the vertical level of dock cleat 60. The mooring device is oriented such that longitudinal axis 68 is in a substantially vertical plane and extends from tube end 72 exterior to tubular member 66 in a direction generally toward watercraft 54. It can be seen from FIG. 7 that it would be extremely difficult or impossible to provide a connection between cleats 58 and 60 without the bend in the tubular member of the illustrated mooring device. Of course, the illustrated mooring device would also be useful where watercraft cleat 58 is at a vertical level substantially above that of dock cleat 60, as well as where watercraft cleat 58 and dock cleat 60 are at approximately the same vertical level.

Obviously, many modifications and variations of the present invention are possible in light of the above teachings. It is, therefore, to be understood that within the scope of the appended claims, the invention may be practiced otherwise than as specifically described.

That which is claimed is:

1. A watercraft mooring device comprising:
   a tubular member having a sidewall with a sidewall hole therethrough, an interior bore, a capped first tube end with a first end hole and a second end hole therethrough, a capped second tube end with a first end hole and a second end hole therethrough;
   a rope having a first rope end and a second rope end, the rope extending from the first rope end exterior to the tubular member and through the sidewall hole into the interior bore, through the interior bore to the first tube end and through the first end hole of the first tube end, back to the first tube end and through the second end hole of the first tube end so as to form a first loop exterior to the tubular member and adjacent to the first tube end, through the interior bore to the second tube end and through the first end hole of the second tube end, back to the second tube end and through the second end hole of the second tube end to the second rope end within the interior bore so as to form a second loop exterior to the tubular member and adjacent to the second tube end, the second rope end in the interior bore being secured within such interior bore so as to prevent being pulled through the second end hole of the second tube end.

2. A watercraft mooring deivce as recited in claim 1 wherein the tubular member has a longitudinal axis and the sidewall hole has a longitudinal axis, and wherein a plane passing through the sidewall hole and perpendicular to the longitudinal axis of the tubular member divides the interior bore into a first portion extending from the plane to the first tube end and a second portion extending from the plane to the second tube end, the longitudinal axis of the sidewall hole extending into and through the first portion of the interior bore.

3. A watercraft mooring device as recited in claim 2 wherein the longitudinal axis of the sidewall hole defines an acute angle with respect to the plane which is in the range of about 30° to about 60°.

4. A watercraft mooring device as recited in claim 3 wherein the plane is nearer to the second tube end than the first tube end as measured along the longitudinal axis of the tubular member.

5. A watercraft mooring device as recited in claim 4 wherein the tubular member has a bend therealong such that the longitudinal axis of the tubular member at the first tube end defines an obtuse angle with respect to the longitudinal axis of the tubular member at the second tube end.

6. A watercraft mooring device as recited in claim 5 wherein the obtuse angle is in the range of about 135° to about 165°.

7. A watercraft mooring device as recited in claim 6 wherein the second rope end in the interior bore is secured therein by means of a knot in the rope near or at the second rope end, such knot having a diameter larger than the second end hole of the second tube end.

8. A watercraft mooring device as recited in claim 7 wherein the rope also has a knot near or at the first rope end having a diameter larger than the diameter of the sidewall hole.

9. A watercraft mooring device as recited in claim 8 further comprising at least one selectively closable clasp connected to at least one of the first or second loops.

10. A watercraft mooring device as recited in claim 9 wherein the tubular member comprises a plastic material.

11. A watercraft mooring device as recited in claim 10 wherein the plastic is polyvinyl chloride.

12. A method for assembling a boat mooring device comprising:
   (a) providing (i) a tubular member having a sidewall with a sidewall hole therethrough, an interior bore, an open first tube end, and an open second tube end, (ii) a first cap having a first cap hole and a second cap hole therethrough, (iii) a second cap having a first cap hole and a second cap hole therethrough, and (iv) a rope having a first rope end and a second rope end;
   (b) passing the second rope end through the sidewall hole, interior bore, and the cap holes of the first and second caps according to the following sequence—through the sidewall hole and into the interior bore, through the interior bore toward and through the first tube end, through the first cap hole of the first cap, through the second cap hole of the first cap so as to form a first loop, back into the interior bore, through the interior bore toward and through the second tube end, through the first cap hole of the second cap, through the second cap hole of the second cap so as to form a second loop, and back into the interior bore;
   (c) after passing the second rope end through the first cap hole of the first cap in (b), fixedly securing the first cap over and to the first tube;
   (d) after the second rope end is passed through the second cap hole of the second cap but before it is passed back in the interior bore in (b), providing a means near or at the second rope end to prevent pulling the second rope end back through the second cap hole of the second cap;
   (e) after (d), fixedly securing the second cap over and to the second tube end;
   wherein after the completion of each of steps (a)–(e), the first rope end remains exterior to the tubular member and the first and second loops are exterior to the tubular member and adjacent to the first and second tube ends, respectively.

13. A method as recited in claim 12 wherein said means is a knot in the rope having a larger diameter than the diameter of the second cap hole of the second cap.

14. A method as recited in claim 13 further comprising tying a knot near or at the first rope end having a diameter larger than the diameter of the sidewall hole to prevent pulling of the first rope end through the sidewall hole.

15. A method for mooring a watercraft to another object, wherein the object has a mooring member and the watercraft also has a mooring member, said method comprising:
   (a) providing a mooring device comprising (i) a tubular member having a sidewall with a sidewall hole therethrough, an interior bore, a capped first tube end with a first end hole and a second end hole therethrough, a capped second tube end with a first end hole and a second end hole therethrough; and (ii) a rope having a first rope end and a second rope end, the rope extending from the first rope end exterior to the tubular member and through the sidewall hole into the interior bore, through the interior bore to the first tube end and through the first end hole of the first tube end, back to the first tube end and through the second end hole of the first tube end so as to form a first loop exterior to the tubular member and adjacent to the first tube end, through the interior bore to the second tube end and through the first end hole of the second tube end, back to the second tube end and through the second end hole of the second tube end to the second rope end within the interior bore so as to form a second loop exterior to the tubular member and adjacent to the second tube end, the second rope end in the interior bore being secured within such interior bore so as to prevent being pulled through the second end hole of the second tube end;
   (b) connecting the first loop to the watercraft mooring member;
   (c) connecting the second loop to the object mooring member;
   (d) after steps (b) and (c), cinching that portion of the rope which extends from the first rope end to the sidewall hole around the tubular member.

16. A method as recited in claim 15 wherein each mooring member is a cleat.

17. A method as recited in claim 16 wherein the object is a dock.

18. A method as recited in claim 15 wherein steps (a)-(e) are repeated with respect to another substantially identical mooring device, another watercraft mooring member, and another object mooring member.

19. A method as recited in claim 15 wherein the horizontal distance between the watercraft mooring members is different than the horizontal distance between the object mooring members.

20. A method as recited in claim 15 wherein the first and second mooring members are at different vertical levels and the tubular member has a longitudinal axis, and wherein the tubular member has a bend therealong such that the longitudinal axis of the tubular member at the first tube end defines an obtuse angle with respect to the longitudinal axis of the tubular member at the second tube end, and further wherein the tubular member is oriented so that the longitudinal axis of the tubular member lies in a substantially vertical plane and extends from the second tube end exterior to the tubular member in a direction generally toward the watercraft.

* * * * *